(12) United States Patent
Hetu

(10) Patent No.: US 8,469,198 B2
(45) Date of Patent: Jun. 25, 2013

(54) SCREEN BASKET WITH REPLACEABLE PROFILED BARS

(75) Inventor: Marc-André Hetu, Blainville (CA)

(73) Assignee: Kadant Canada Corp., Summerstown, Ontario (CA)

( * ) Notice: Subject to any disclaimer, the term of this patent is extended or adjusted under 35 U.S.C. 154(b) by 127 days.

(21) Appl. No.: 12/807,787

(22) Filed: Sep. 14, 2010

(65) Prior Publication Data

US 2011/0005981 A1    Jan. 13, 2011

Related U.S. Application Data

(63) Continuation of application No. 11/920,139, filed as application No. PCT/CA2006/000722 on May 5, 2006, now abandoned.

(60) Provisional application No. 60/678,819, filed on May 9, 2005.

(51) Int. Cl.
 *B07B 1/20* (2006.01)
(52) U.S. Cl.
 USPC ............................ 209/305; 209/273; 210/413
(58) Field of Classification Search
 USPC ................. 209/405–411, 273, 283, 305, 306; 210/413–415, 498, 512.1
 See application file for complete search history.

(56) References Cited

U.S. PATENT DOCUMENTS

| | | | |
|---|---|---|---|
| 689,934 A | 12/1901 | Vrooman et al. | |
| 703,682 A | 7/1902 | Vrooman et al. | |
| 2,065,263 A | 12/1936 | Beldam | |
| 3,220,340 A | 11/1965 | Frykhult | |
| 3,515,281 A | 6/1970 | Vore et al. | |

(Continued)

FOREIGN PATENT DOCUMENTS

| | | |
|---|---|---|
| CA | 2072776 A1 | 1/1993 |
| DE | 39 42 591 A1 | 6/1991 |

(Continued)

OTHER PUBLICATIONS

Japanese Office Action issued Jul. 31, 2012 for Japanese Application No. 2010-533393 filed Jul. 27, 2010.

*Primary Examiner* — Stefanos Karmis
*Assistant Examiner* — Kalyanavenkateshware Kumar
(74) *Attorney, Agent, or Firm* — Wegman, Hessler & Vanderburg

(57) ABSTRACT

A screen basket with replaceable profiled bars and method of making such screen basket are described herein. The screen basket includes profiled bars evenly spaced circumferentially to form a plurality of continuous slots that covers the whole basket length. The profiled bars are fixed in place by a backing structure, including support rings. In pulp and paper industry, this type of basket is mainly used for pulp screening and is commonly referred to as wedge wire basket. As opposed to conventional wedge wire baskets, in which the profiled bars are permanently joined to the rings, the present invention allows replacing the profiled bars when required and to fully re-use the main structural elements. This is achieved with an assembly that allows to insert the profiled bars, preferably consecutively sled into each aligned ring grooves in a vertical movement. The ring grooves are profiled such that there is sufficient clearance for sliding in the profiled bars. The mounting clearance is then removed radially to hold the profiled bars in place. According to an illustrative embodiment, this is achieved by squeezing an element made of compressible material, and placed between each ring pair.

25 Claims, 11 Drawing Sheets

U.S. PATENT DOCUMENTS

| | | | |
|---|---|---|---|
| 3,837,499 A | 9/1974 | Luthi | |
| 3,941,703 A | 3/1976 | Binard | |
| 3,962,091 A | 6/1976 | Doria et al. | |
| 4,002,540 A | 1/1977 | Bixby | |
| 4,410,424 A | 10/1983 | Chupka et al. | |
| 4,818,403 A * | 4/1989 | Nagaoka | 210/488 |
| 4,822,488 A | 4/1989 | Shatuck | |
| 4,828,689 A | 5/1989 | Lamort | |
| 5,061,370 A | 10/1991 | Ferland et al. | |
| 5,071,543 A | 12/1991 | Rajala | |
| 5,090,721 A | 2/1992 | Lange | |
| 5,094,360 A | 3/1992 | Lange | |
| 5,200,072 A | 4/1993 | Frejborg et al. | |
| 5,221,437 A | 6/1993 | Sieron et al. | |
| 5,285,560 A | 2/1994 | Gero et al. | |
| 5,387,340 A | 2/1995 | Ackerman | |
| 5,394,600 A | 3/1995 | Chen | |
| 5,503,323 A | 4/1996 | Bergkvist et al. | |
| 5,504,987 A | 4/1996 | Bergkvist | |
| 5,513,757 A | 5/1996 | Papetti | |
| 5,595,307 A | 1/1997 | Hautala | |
| 5,605,234 A | 2/1997 | Aikawa | |
| 5,647,128 A | 7/1997 | Aikawa | |
| 5,718,826 A | 2/1998 | Frejborg | |
| 5,788,860 A | 8/1998 | Yasue et al. | |
| 5,791,495 A | 8/1998 | Gero et al. | |
| 5,798,025 A | 8/1998 | Iwashige | |
| 5,799,798 A | 9/1998 | Chen | |
| 5,804,075 A | 9/1998 | Aikawa | |
| 5,954,956 A | 9/1999 | Lutz et al. | |
| 5,968,357 A | 10/1999 | Doelle et al. | |
| 6,047,834 A | 4/2000 | Dolle et al. | |
| 6,051,103 A | 4/2000 | Aikawa | |
| 6,056,126 A | 5/2000 | Schabel et al. | |
| 6,092,286 A | 7/2000 | Lange | |
| 6,131,743 A | 10/2000 | Czerwoniak et al. | |
| 6,138,838 A | 10/2000 | Soik et al. | |
| 6,338,412 B1 | 1/2002 | Serres et al. | |
| 6,340,805 B1 | 1/2002 | Ljokkoi | |
| 6,425,486 B1 | 7/2002 | Andersson et al. | |
| 6,426,003 B2 | 7/2002 | May et al. | |
| 6,491,168 B1 | 12/2002 | Lutz et al. | |
| 6,550,620 B2 | 4/2003 | Fukudome et al. | |
| 6,579,458 B2 | 6/2003 | Mickelat et al. | |
| 6,589,424 B1 * | 7/2003 | Nieminen | 210/497.01 |
| 6,649,068 B2 | 11/2003 | Phillips | |
| 6,708,829 B2 | 3/2004 | Robertson et al. | |
| 6,745,469 B1 | 6/2004 | Soik et al. | |
| 6,785,964 B2 | 9/2004 | Raphael | |
| 6,789,681 B2 * | 9/2004 | Czerwoniak et al. | 209/405 |
| 6,915,910 B2 | 7/2005 | Lutz et al. | |
| 7,125,491 B2 | 10/2006 | Gabl et al. | |
| 7,188,733 B2 | 3/2007 | May et al. | |
| RE39,940 E | 12/2007 | Frejborg et al. | |
| 7,374,050 B2 | 5/2008 | Grace et al. | |
| 7,506,767 B2 | 3/2009 | Laakso | |
| 2002/0130075 A1 | 9/2002 | May et al. | |
| 2003/0226801 A1 | 12/2003 | Gassmann et al. | |
| 2004/0099583 A1 | 5/2004 | Frejborg | |
| 2004/0149633 A1 * | 8/2004 | Fredriksson | 209/411 |
| 2007/0074998 A1 | 4/2007 | Langener | |
| 2007/0114157 A1 | 5/2007 | Fredriksson | |
| 2007/0199362 A1 | 8/2007 | Lange | |
| 2007/0220942 A1 | 9/2007 | Lange | |
| 2007/0221544 A1 | 9/2007 | Chen | |

FOREIGN PATENT DOCUMENTS

| | | |
|---|---|---|
| DE | 42 24 727 A1 | 2/1994 |
| DE | 100052715 A1 | 2/2002 |
| EP | 0182688 A1 | 5/1986 |
| EP | 0206975 A2 | 12/1986 |
| EP | 0294832 A2 | 12/1988 |
| EP | 0316570 A2 | 5/1989 |
| EP | 0707 109 A1 | 4/1996 |
| EP | 0 764 737 A1 | 3/1997 |
| EP | 0 814 194 A1 | 12/1997 |
| EP | 0 926 295 A1 | 6/1999 |
| EP | 0982 433 A2 | 3/2000 |
| EP | 1 273 696 A1 | 1/2003 |
| GB | 2033242 A | 5/1980 |
| JP | 2001 003289 A | 1/2001 |
| JP | 2001347108 A | 12/2001 |
| JP | 2007-224488 A | 9/2007 |
| JP | 2007224489 A | 9/2007 |
| WO | WO 90/12147 | 10/1990 |
| WO | WO 91/10009 | 7/1991 |
| WO | WO 96/30587 | 10/1996 |
| WO | WO 97/10380 | 3/1997 |
| WO | WO 97/34045 | 9/1997 |
| WO | WO 98/14658 | 4/1998 |
| WO | WO 00/65151 | 11/2000 |
| WO | WO 00/73579 A1 | 12/2000 |
| WO | WO 02/34357 A1 | 5/2002 |
| WO | WO 02/083263 A1 | 10/2002 |
| WO | 03028846 | 4/2003 |
| WO | WO 2006/008332 A2 | 1/2006 |
| WO | WO 2006/058567 A1 | 6/2006 |
| WO | WO 2007/051908 A1 | 5/2007 |
| WO | WO 2009/062287 A1 | 5/2009 |

* cited by examiner

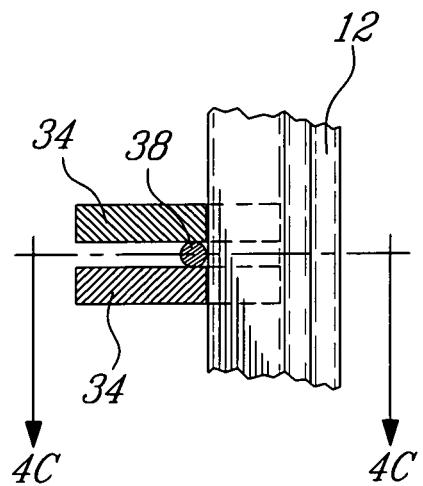 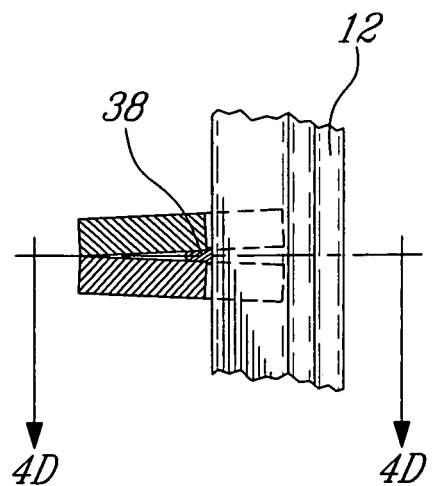
Fig-4A  Fig-4B
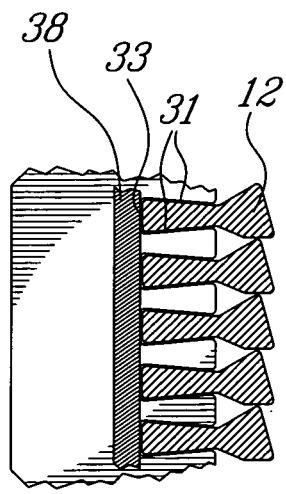 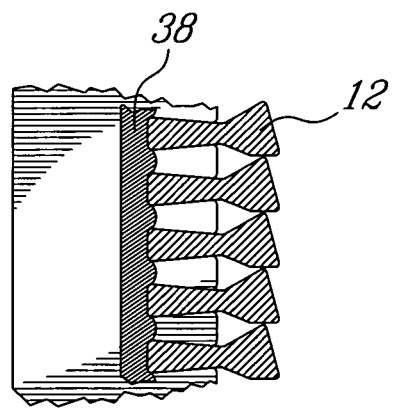
Fig-4C  Fig-4D

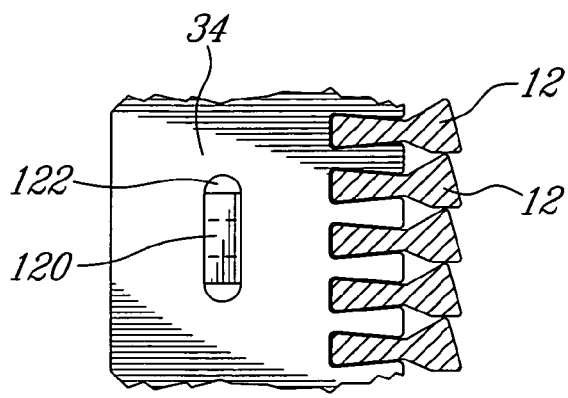
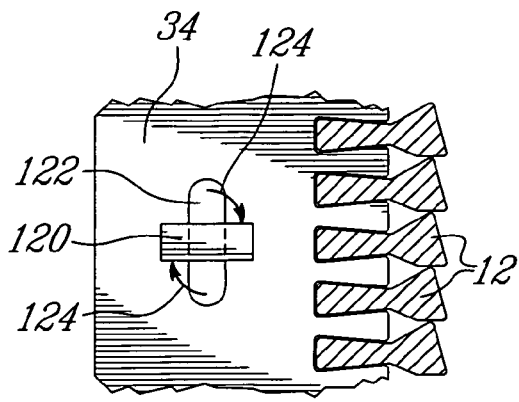
Fig-14A  Fig-14B
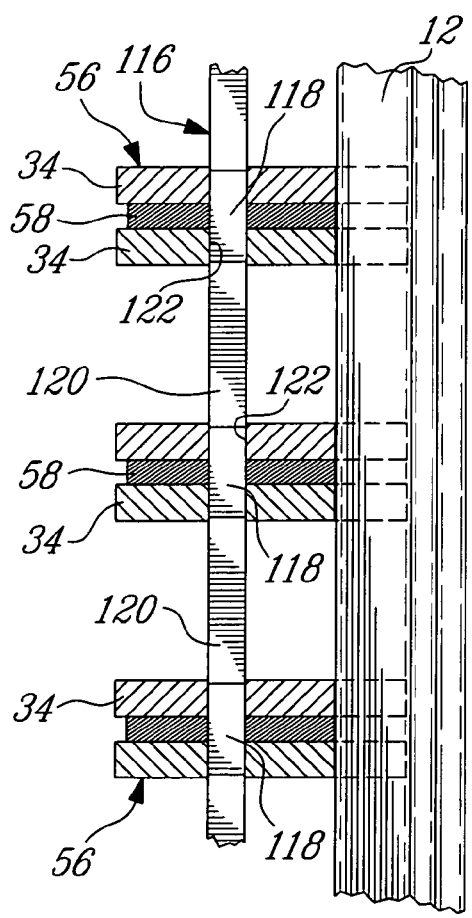
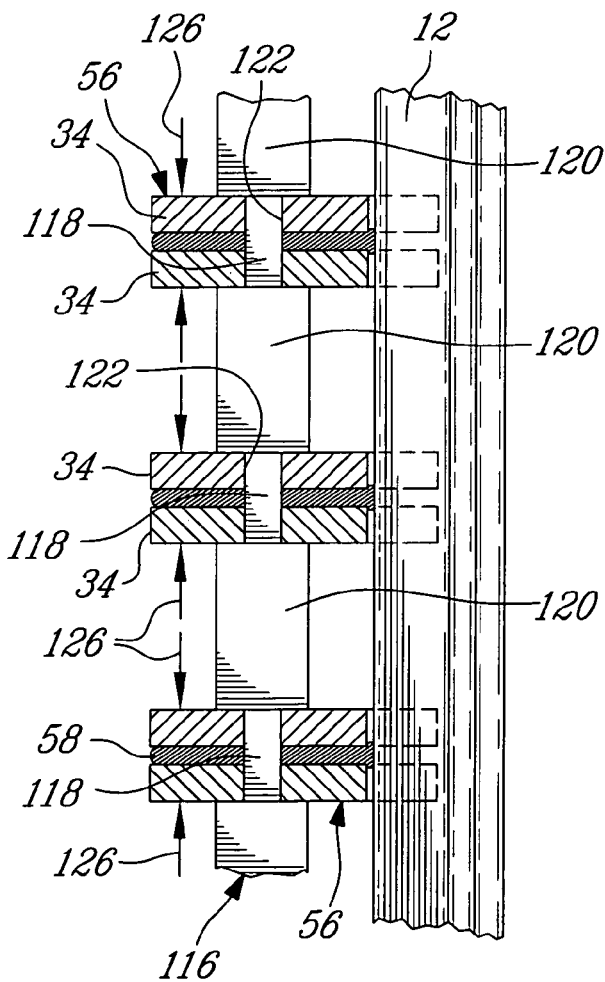
Fig-15A  Fig-15B

SCREEN BASKET WITH REPLACEABLE PROFILED BARS

CROSS REFERENCE TO RELATED APPLICATIONS

The present application is a continuation of application Ser. No. 11/920,139 filed Nov. 9, 2007 which in turn was a U.S. national phase filing under 35 USC §363 and §365 of PCT International Application Serial No. PCT/CA2006/000722 filed May 5, 2006 claiming priority of U.S. Provisional Patent Application Ser. No. 60/678,819 filed May 9, 2005.

FIELD OF INVENTION

The present invention relates to screen baskets used for screening fiber suspensions, and more particularly to a screen basket which can be applied in the pulp and paper industry, for example in pressure screen applications. The innovations of the present invention can also be advantageously applied for basket manufacturing used for screw presses or other filtration or dewatering devices.

BACKGROUND OF THE INVENTION

Pulp screening in the pulp and paper industry is generally achieved with pressure screens in which the furnish is pumped to remove oversized contaminants, fiber bundles, wood fragments, and/or sort long and short fibers, and/or stiff and soft fibers. Several pressure screen configurations are in use today. The two main configurations are pressure screens using substantially cylindrical outward flow basket, and screens using substantially cylindrical inward flow basket. All the pressure screens generally require the accepted stock to pass through the holes or slots of a screen basket. Rejects too large to pass through the screen basket or wedge-wire basket openings leave through a rejects outlet. A rotor is used to prevent the slots or holes from plugging. The rotor creates pressure pulsations resulting in sufficient cleaning action of the screening surface to avoid plugging condition.

In applications with aggressive rotor, screen baskets are subjected to high dynamic loading from the pressure pulsations generated by the rotor. In such applications, ring fatigue failure of wedge wire basket is commonly observed and the mills are often forced to get back to milled slot or drilled baskets, resulting in a loss of capacity and/or efficiency for obtaining acceptable screen basket life.

Wedge wire baskets are most commonly welded assemblies. Baskets from these constructions suffer to various degrees from distortion, residual stress, stress concentration from welded joint geometry and weld defects, which can normally be associated with most welding processes.

Among the screen baskets commercially available, the wedge wire baskets are the ones offering the highest open area because of their continuous slots extending over the entire basket length. The accuracy of the cold drawing process used in wire manufacturing can be advantageously used to achieve exceptionally accurate slot width and highly repeatable contour geometry, which contribute in providing better efficiency and capacity than milled slot or drilled baskets.

Conventional wedge wire screen baskets generally comprise a plurality of wedge wires (profiled bars) that are permanently joined to support rings by various methods. It should be understood by the term "permanently joined" that a destructive method, such as cutting, grinding, chemical attack, etc., would be required to remove the profiled bars. Support rings are necessary to withstand the loading to which the basket is subjected during screening. For severe applications, the screen basket are often reinforced using additional welded or shrink fit rings or backing jacket.

Some efforts have been made by manufacturers to re-use a portion of the main structure by using replaceable screening elements. However, the manufacturing of these elements is costly and requires several steps and more material at each rebuild. Also, loss in open area is sometimes generated because of the fixing devices such as cage or backing jacket. Finally, the slot and contour accuracy and uniformity are also compromised because of the assembly method. An example of a wedge wire screen basket which has its main structure re-use can be seen in International Patent Application No. WO 02/083263 A1, published Oct. 24, 2002, naming Lutz et al. as the inventors and titled "Screen Cylinder and Method".

U.S. Pat. No. 5,791,495, issued to Gero et al. on Aug. 11, 1998 and titled "Paper Pulp Screen Cylinder" describes a basket made with milled bars to obtain a basket with replaceable profiled bars. However, the proposed basket is not provided with continuous slots over the entire basket length, which compromises its capacity. Also, the manufacturing of the profiled bars adapted for the proposed screen basket requires additional steps, such as milling, cutting, and machining. Furthermore, the quantity of parts to be assembled becomes very high because each row requires a set of milled bars.

U.S. Pat. No. 6,051,103 issued to Aikawa on Apr. 18, 2000 and titled "Paper-Making Screen Apparatus" concerns an inward-flow screen basket provided with both replaceable bars and continuous slots. A drawback of Aikawa's basket is that a minimum clearance has to be provided between the rod-shaped members and the engaging sections of the support members to allow insertion of the rod-shaped members therein. This clearance may cause the movements of the rod-shaped members in the engaging sections during operations and even vibrations, which in turn can cause fatigue and premature wear of the parts.

OBJECTS OF THE INVENTION

An object of the present invention is therefore to provide an improved screen basket.

Another object of the invention is to provide a demountable screen basket having replaceable profiled bars which can be locked in place.

SUMMARY OF THE INVENTION

More specifically, in accordance with a first aspect of the present invention, there is provided a screen basket comprising:

a plurality of profiled bars generally aligned along a longitudinal axis so as to define a slotted cylindrical wall having an inner side and an outer side extending between two longitudinal ends; each of the profiled bars having a radial profiled portion and a radial locking portion joined at an intermediate cross section; the radial locking portion having an irregular cross section including at least one radial cross section wider than the intermediate cross section; and a plurality of support ring assemblies, each removably mounted to at least some of the plurality of profiled bars for assembling the plurality of profiled bars into the slotted cylindrical wall; each of the plurality of support ring assemblies including a stack of first and second annular support rings; at least one of the first and second support rings including a plurality of grooves; each groove being configured and sized for complementary receiving the radial locking portion of a respective one of the profiled bars; the first and second support rings being mounted to each other and to the plurality of profiled bars so as to yield a locking force towards the radial locking portion of the profiled bars, thereby locking the profiled bars thereonto.

According to a second aspect of the present invention, there is provided a method for assembling a screen basket comprising:

providing a plurality of support ring assemblies including first and second support rings; at least one of the first and second support rings including a plurality of grooves;

providing a plurality of profiled bars, each having a radial profiled portion and a radial locking portion joined at an intermediate cross section; the radial locking portion having an irregular cross section including at least one radial cross section wider than the intermediate cross section; the radial locking portion being configured for complementary insertion into one of the grooves of first and second support rings;

inserting the locking portions of the profiled bars into the grooves of the first and second support rings so as to generally align the profiled bars along a longitudinal axis and to define a slotted cylindrical wall having an inner side and an outer side extending between two longitudinal ends; and applying a locking force towards the radial locking portion of the profiled bars for releasably locking the profiled bars in the support ring assemblies.

It is to be noted that the magnitude of the locking force is such that it is several times that generated by pressure differential and pressure pulsations from the rotor of the apparatus into which the screen basket is used, which prevents movement of the profiled bar during normal operation.

One of the benefits of the present invention is that it provides a basket assembly for which the profiled bars and other parts thereof can be replaced. Some other benefits that also substantially improve screen basket technology are:

The profiled bar assembly does not require any welding. This provide substantial increase of the profiled bar fatigue strength since it avoids detrimental conditions that can be created in a welded assembly (notches, cracks, distortion, residual stresses, metallurgical problems, etc.).

The profiled bars are integral, i.e., the assembly does not require any hole that would weaken the bars.

No forming stress is present in the rings since they are cut round from plate before assembly.

The present screen basket can be adapted for both inward flow and outward flow basket configurations.

The present screen basket can also be used advantageously for conical screens or open shape panels such as flat screens, curved section screens, or any imaginable and practical shapes of screens using bar assembly.

A screen basket according to the present invention is not limited to the paper or pulp industry. It can also be used in other industries using profiled bars to generate a plurality of screening, draining, filtering, classifying or sorting slots such as but not limited to mining, petrochemical, food and beverage, and water treatment industries, in various forms and configurations of screening surface (cylinders, curved sectors, flat sections, etc.). It can further be used in the manufacturing of special drainage rolls.

Other objects, advantages and features of the present invention will become more apparent upon reading the following non restrictive description of illustrated embodiments thereof, given by way of example only with reference to the accompanying drawings.

BRIEF DESCRIPTION OF THE DRAWINGS

In the appended drawings:

FIGS. 4A-4B are isolated radial cross sections of the assembly of one support ring assembly and profiled bars from FIG. 1; FIG. 4A illustrating the compressible ring before being compressed and FIG. 4B illustrating the compressible ring compressed;

FIGS. 4C-4D are cross sections taken respectively along line 4C-4C on FIG. 4A and along line 4D-4D on FIG. 4B;

FIG. 5A illustrating the compressible insert before being compressed and FIG. 5B illustrating the compressible insert compressed;

FIG. 6A illustrating the compressible insert before being compressed and FIG. 6B illustrating the compressible insert compressed;

FIG. 9A illustrating the compressible inserts before being compressed and FIG. 9B illustrating the compressible inserts compressed;

FIG. 10A illustrating the open ring opened and FIG. 10B illustrating the open ring closed;

FIG. 10C illustrating the open ring opened and FIG. 10D illustrating the open ring closed;

FIGS. 14A-14B are partial top plan cross sections of a clamping mechanism for a screen basket according to a tenth illustrated embodiment of the present invention; FIG. 14A illustrating the clamping mechanism in a mounting position; FIG. 14B illustrating the clamping mechanism in a pressed position; and FIGS. 15A-15B are partial side cross sections of the clamping mechanism from FIGS. 14A-14B; FIG. 15A illustrating the clamping mechanism in a mounting position; FIG. 15B illustrating the clamping mechanism in a pressed position.

DETAILED DESCRIPTION OF EXEMPLARY EMBODIMENTS

Figure 1:
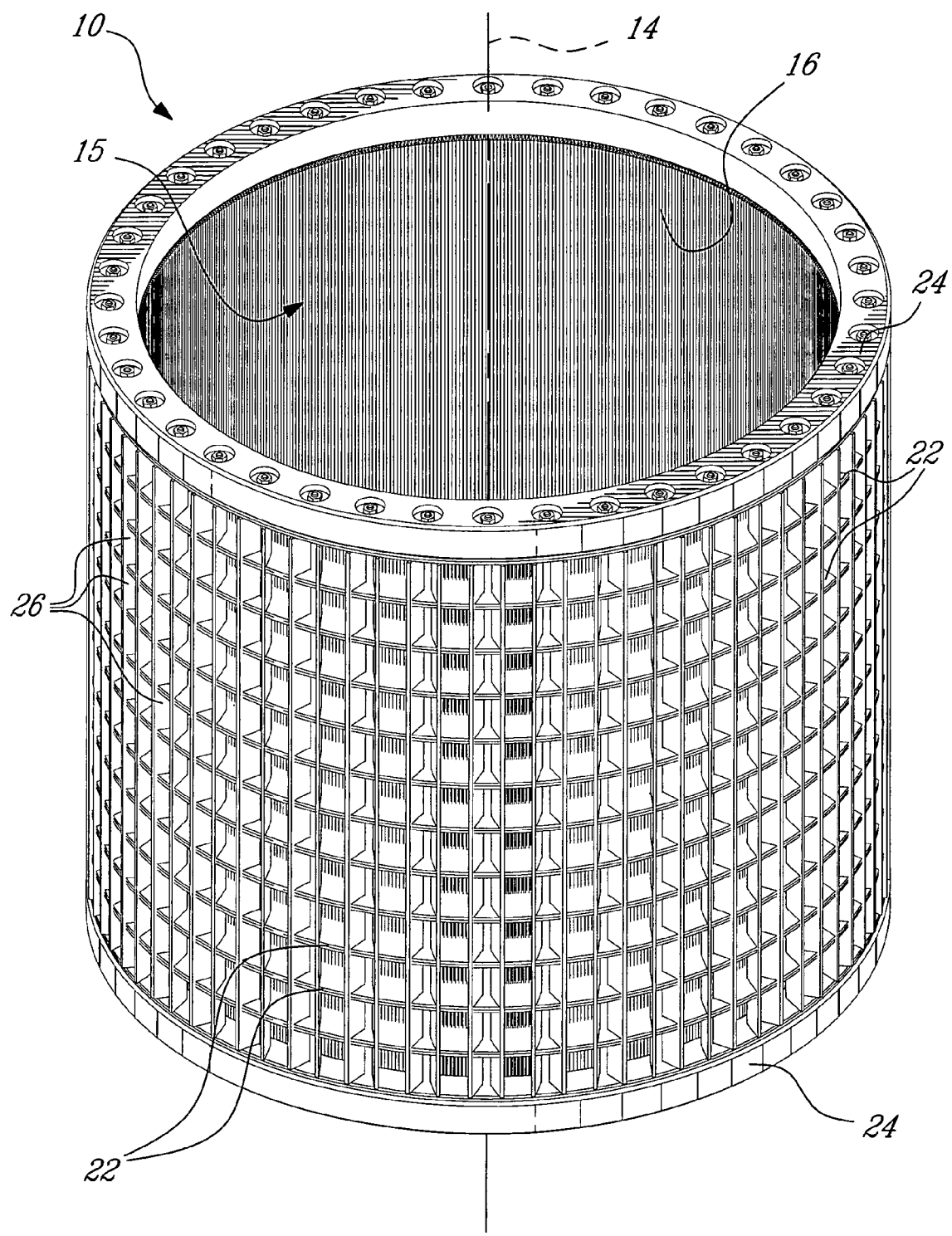
FIG. 1 is a perspective view of a demountable screen basket according to a first illustrated embodiment of the present invention.

In the following detailed description, same or corresponding elements are generally indicated by same reference numerals. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents. Also, the entire content of the specification, claims, and drawings of parent application Ser. No. 11/920,139 is hereby incorporated by reference herein.

Figure 2:
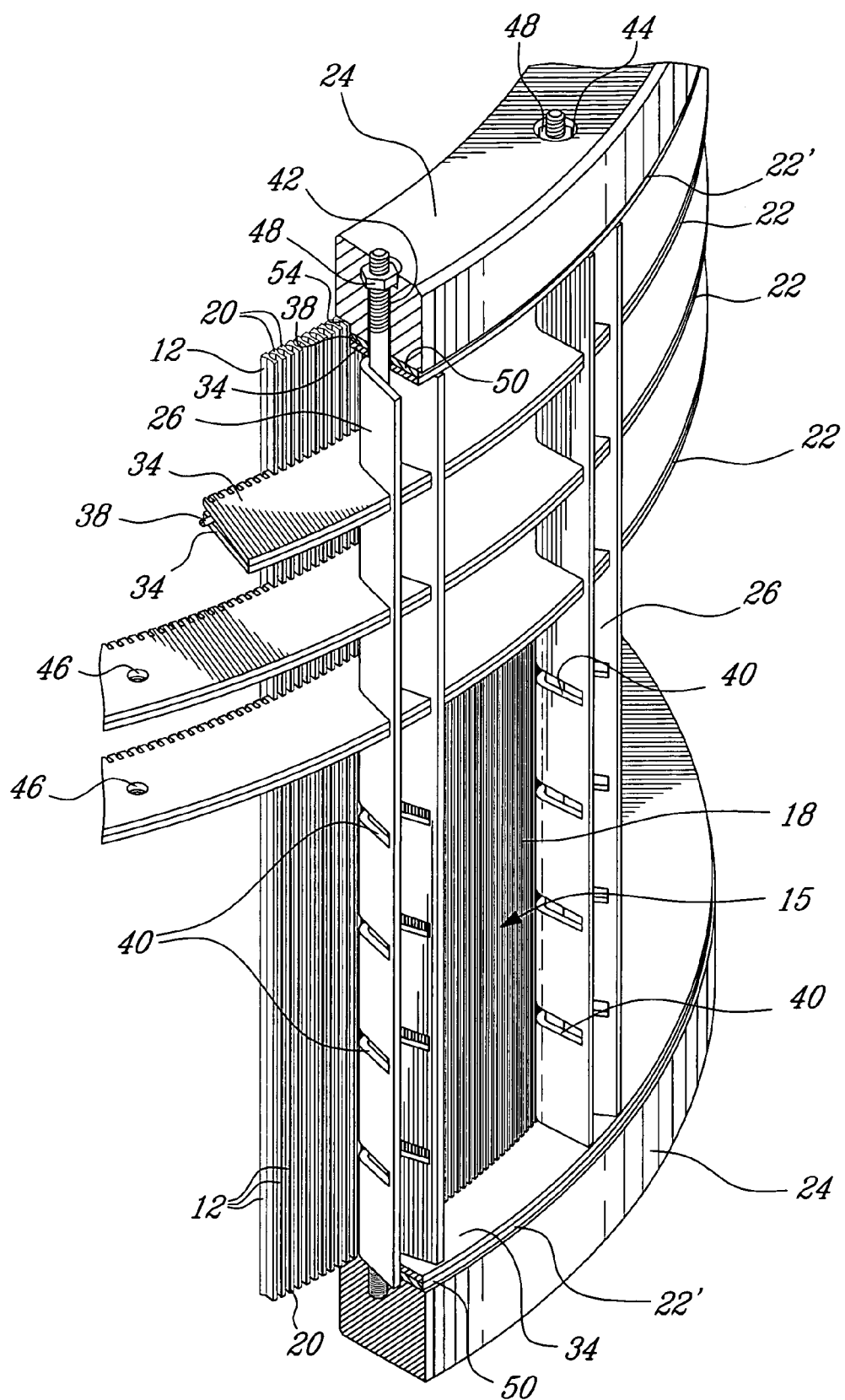
FIG. 2 is a perspective partly sectional view of FIG. 1.
Figure 3:
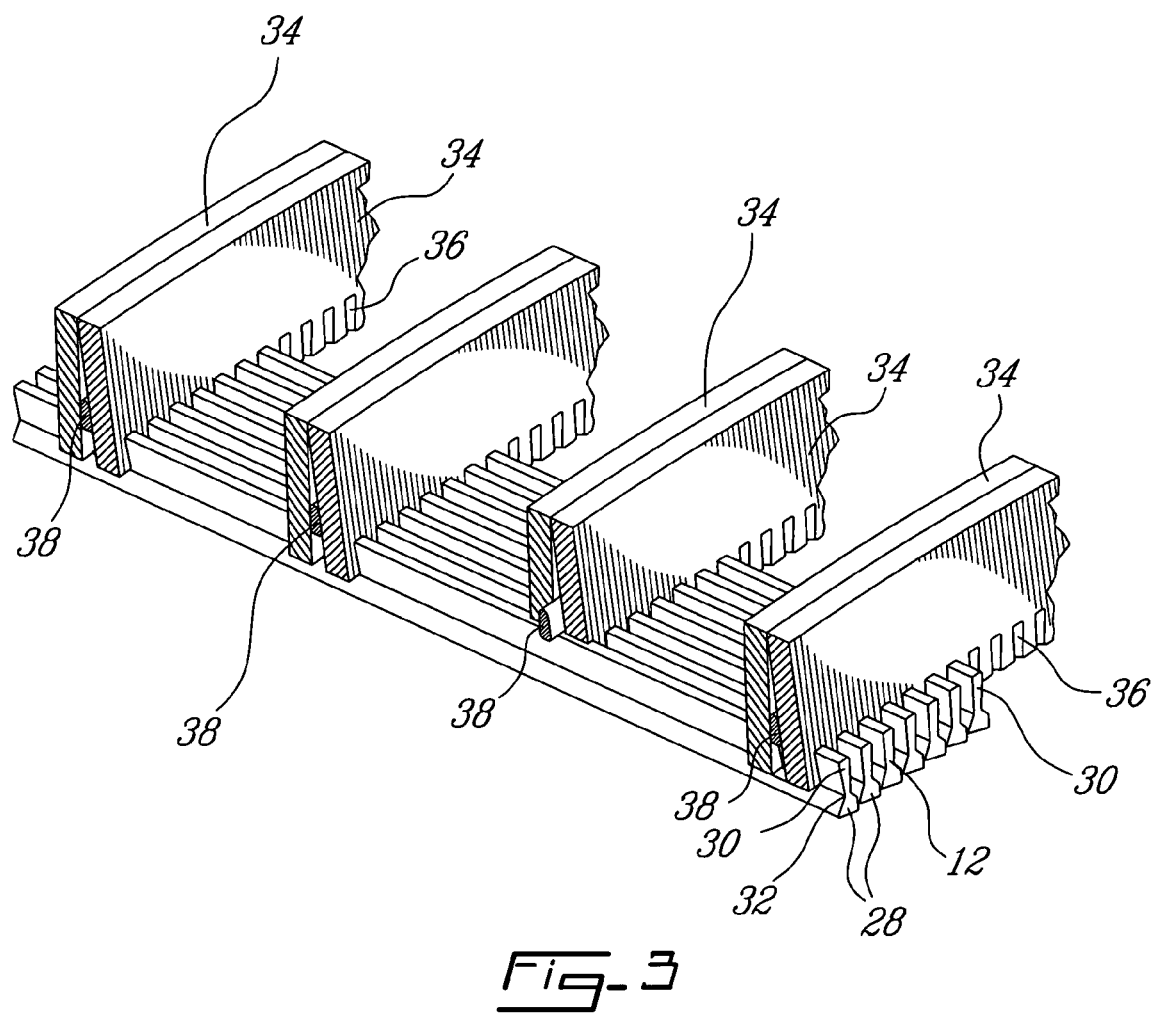
FIG. 3 is a partial close-up view illustrating the assembly of support ring assemblies and profiled bars from FIG. 1.

Turning now to FIGS. 1-3 of the appended drawings, a demountable screen basket 10 according to a first illustrated embodiment of the present invention will be described.

The demountable screen basket 10 comprises a plurality of profiled bars 12 aligned along a longitudinal axis 14 and positioned so as to define a slotted cylindrical wall 15 having an inner side 16, defining a screening surface, and an outer side 18 both extending between two longitudinal ends 20, a plurality of support ring assemblies 22 and 22' mounted to the plurality of profiled bars 12 transversally therefrom for assembling the plurality of profiled bars 12 into the slotted cylindrical walls 15, a pair of annular end flanges 24, each for receiving a respective end 20 of the plurality of profiled bars 12, and a plurality of clamping posts 26 secured to both annular flanges 24 for compressing the support ring assemblies 22.

As can be better seen from FIG. 3, each profiled bar 12 has a profiled portion 28 and a tapered locking portion 30 joined at an intermediate cross section 32. Turning briefly to FIG. 4C, the tapered locking portion 30 has two angled faces 31 extending from an outer face 33, thereby defining a dovetail.

Each support ring assembly 22 includes a stack of first and second identical support rings 34 provided with equidistanced grooves 36 configured for complementary receiving the tapered locking portion 30 of a profiled bar 12. Since the locking portions 30 are tapered, the profiled bars 12 are prevented from being released radially. Each profiled bar 12 is however slidable along the support ring assemblies 22 and therefore removably mounted thereto.

The grooves 36 are located on the inner side diameter of the rings 34 for outward flow screen basket configuration, such as screen basket 10. For inward flow screen basket configuration (not illustrated), the grooves 36 are located on the outer side diameter of the rings 34, and the clamping posts 26 are positioned on the inner side of the basket.

It should be noted that the rings 34 are manufactured before assembly and already include the assembly grooves 36.

To ease the mounting of the profiled bars 12 into the grooves 36, the locking portions 30 and grooves 36 are dimensioned as to yield a clearance. However, this clearance may result in slight movements between the profiled bars 12 and the support ring assemblies 22 and 22' when the screen basket 10 is under stress.

As will now be described in more detail, the screen basket 10 includes means to bias the locking portions 30 of the profiled bars 12 towards respective contours of the grooves 36 so as to lock the profiled bars 12 therein for applications wherein relative movements of the profiled bars 12 and support ring assemblies 22 can be detrimental.

The screen basket 10, as well as any screen basket from the present invention, can be used in a screening apparatus either held fixed or put in constant or intermittent rotation along axis 14, or put under constant or intermittent vibration or displacement.

With reference to FIG. 3, each support ring assembly 22 includes a compressible insert, in the form of an elastomer ring 38 mounted between the two rings 34, adjacent to the locking portions 30 of the profiled bars 28.

As can be seen from FIGS. 4A and 4C, the elastomer ring 38, which has a circular cross section, is initially positioned between the two support rings 34 and around the circumference defined by the profiled bars 12, after the mounting of the profiled bars 12 into the ring grooves 36. Then, the two rings 34 are pressed together axially, forcing the insert 38 towards the profiled bars 12 as illustrated in FIGS. 4B and 4D. This forces the locking portions 30 of the profiled bars 12 towards the grooves 36, eliminating the above-mentioned clearance, thereby locking the profiled bars 12 into the grooves 36 as discussed hereinabove.

Even though the elastomer ring 38 is illustrated as having a circular cross section, an elastomer ring having other another regular or irregular cross section, including for example a rectangular cross section, can also be provided.

Now referring to FIG. 2, to press the stack of support rings 34, each pair of rings 34 are clamped together at preferably equally spaced circumferential locations by the clamping posts 26. The clamping posts 26 are in the form of combs 26 provided with longitudinal notches 40 for receiving the pair of rings 34. More specifically, the notches 40 are tapered to thereby axially compressing the pair of rings 34 when they are inserted therein as shown in FIG. 2.

Even though, the clamping combs 26 are illustrated as V or U-shaped elongated members, they can also be tubular for example. The clamping combs 26 can further be in the form of elongated beam-like members provided with V-shaped brackets (not shown) mounted thereon for receiving the support ring assemblies 22.

The notches 40 are distributed to locate the support ring assemblies 22 at desired locations along the basket length with uniform or variable spacing, to have for example tighter ring pair spacing in a more critical region of the basket 10.

The clamping combs 26 are secured to the end flanges 24 via mounting rods 42.

More specifically, the annular end flanges 24 and the rings 34 are provided with respective co-axial holes 44 and 46 for receiving the rods 42. The rods 42 are provided with longitudinal threaded ends for securing directly into holes in one of the two flanges 22 and for receiving a nut 48 through respective counterbores at the other end. Other means can also be used to removably secure the rods 42 to the flanges 24.

Also, the clamping combs 26 can alternatively be positioned so as to show an angle with both the support ring assemblies 22 and 22' and the profiled bars 12 and are thus not limited to the position aligned with the profiled bars 12 illustrated for example in FIGS. 1-2.

Still referring to FIG. 2, each of the end support ring assemblies 22', which are mounted at each of the longitudinal end of the clamping combs 34 so as to abut the flanges 24, include a first grooved ring 34 contacting the combs 26 and a non-grooved ring 50, having a larger inside diameter than the first grooved ring 34, contacting a respective flange 24. A compressible insert 38 is provided between the non-grooved ring 50 and the circumference created by the locking portions 30 of the profiled bars 12 for biasing the bars 12 into the grooves of the rings 34 of the assembly 22', the face of the flange 24 contacting the inside ring 50 acting as a second support ring for compressing onto the insert 38.

The thickness of the non-grooved ring 50 is selected so that it is smaller than the uncompressed insert 38.

Each of the two end flanges 24 includes a recess 54 on its peripheral inner side for respectively receiving the first and second longitudinal ends 20 of the profiled bars.

An illustrated method of assembling the basket 10 includes:

Inserting the profiled bars 12 into the grooves of the support ring assemblies 22-22';

Inserting the inserts 38 within the support ring assemblies 22-22';

Installing the clamping combs 26 onto the support ring assemblies 22-22' in line with the holes 46;

While the clamping combs 26 are maintained in place, inserting the rods 42 into the holes 46, thereby locking the combs 26 in place; and Securing the end flanges 24 as described hereinabove.

Other method of assembling the basket 10 can also be used.

A person skilled in the art will appreciate that the basket 10 is completely demountable. Therefore, when worn or broken components of the basket 10 need to be replaced, the basket 10 can be disassembled so as to remove these components and reuse the other, still usable, components.

It has been found that any elastomeric material having a Young's modulus lower than about 20 GPa is suitable to be used as the insert.

Even though the basket 10 is illustrated with equally distanced clamping combs 26, a screen basket according to the present invention can be provided with unequally spaced clamping combs 26.

Also, the number of profiled bars 12, support ring assemblies 22 and/or 22', and clamping combs 26 may vary.

Furthermore, even though the screen basket 10 has been described as a screen suitable for outward flow, it is believed to be within the reach of a person skilled in the art to adapt the present teaching for an inward flow application. For example, in such a case, the support ring assemblies 22 and 22' and the clamping combs 26 are positioned on the inner side of the cylinder formed by the profiled bars 12, with the profiled portions thereof located on the outside of the cylinder.

Figure 5A:
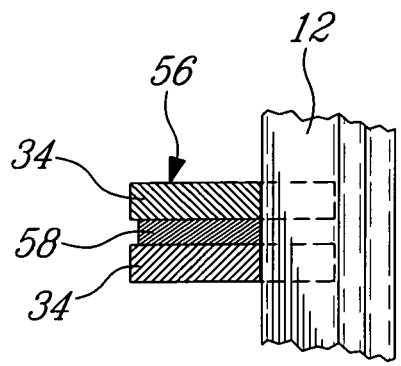
FIGS. 5A and 5B are isolated radial cross sections of the assembly of a profiled bar and a support ring assembly according to a second illustrative embodiment of the present invention.
Figure 5B:
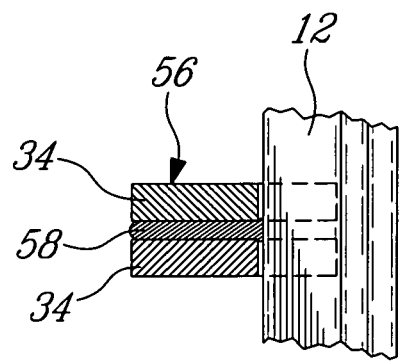

Also, the support ring assemblies can take many forms. FIGS. 5A-5B illustrates a support ring assembly 56 according to a second illustrated embodiment of the present invention. Since the support ring assembly 56 is similar to the support ring assembly 22, and for concision purposes, only the differences between the two assemblies 56 and 22 will be described herein in more detail. The compressible insert 58 is in the form of a wide ring having a rectangular cross section and a width similar to the width of the rings 34. Again, the insert 58 is forced against the profiled bars 12 when the two metallic rings 34 are pressed together.

Figure 6A:
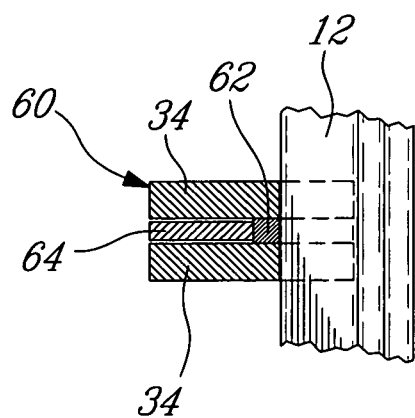
FIGS. 6A and 6B are isolated radial cross sections of the assembly of a profiled bar and a support ring assembly according to a third illustrative embodiment of the present invention.
Figure 6B:
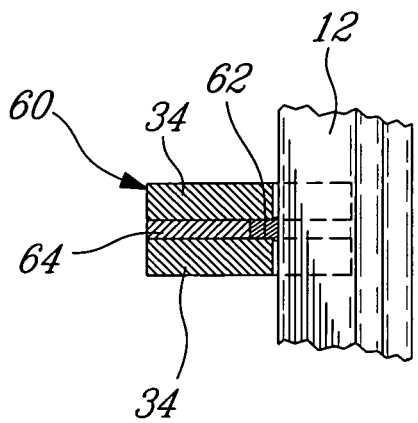

FIGS. 6A-6B illustrates a support ring assembly 60 according to a third illustrated embodiment of the present invention. Since the support ring assembly 60 is similar to the support ring assembly 22, and for concision purposes, only the differences between these two assemblies 60 and 22 will be described herein in more detail. The support ring assembly 60 includes a compressible insert 62 in the form of a narrow ring having a width preferably smaller than the width of the metallic rings 34 and characterized by a thickness at rest. The assembly 60 further includes an intermediate ring 64 positioned between the support rings 34 and having a thickness smaller than the insert 62 thickness at rest. The insert 62 is forced against the profiled bars 12 when the stack of metallic rings 34 and 64 is axially compressed.

Figure 7:
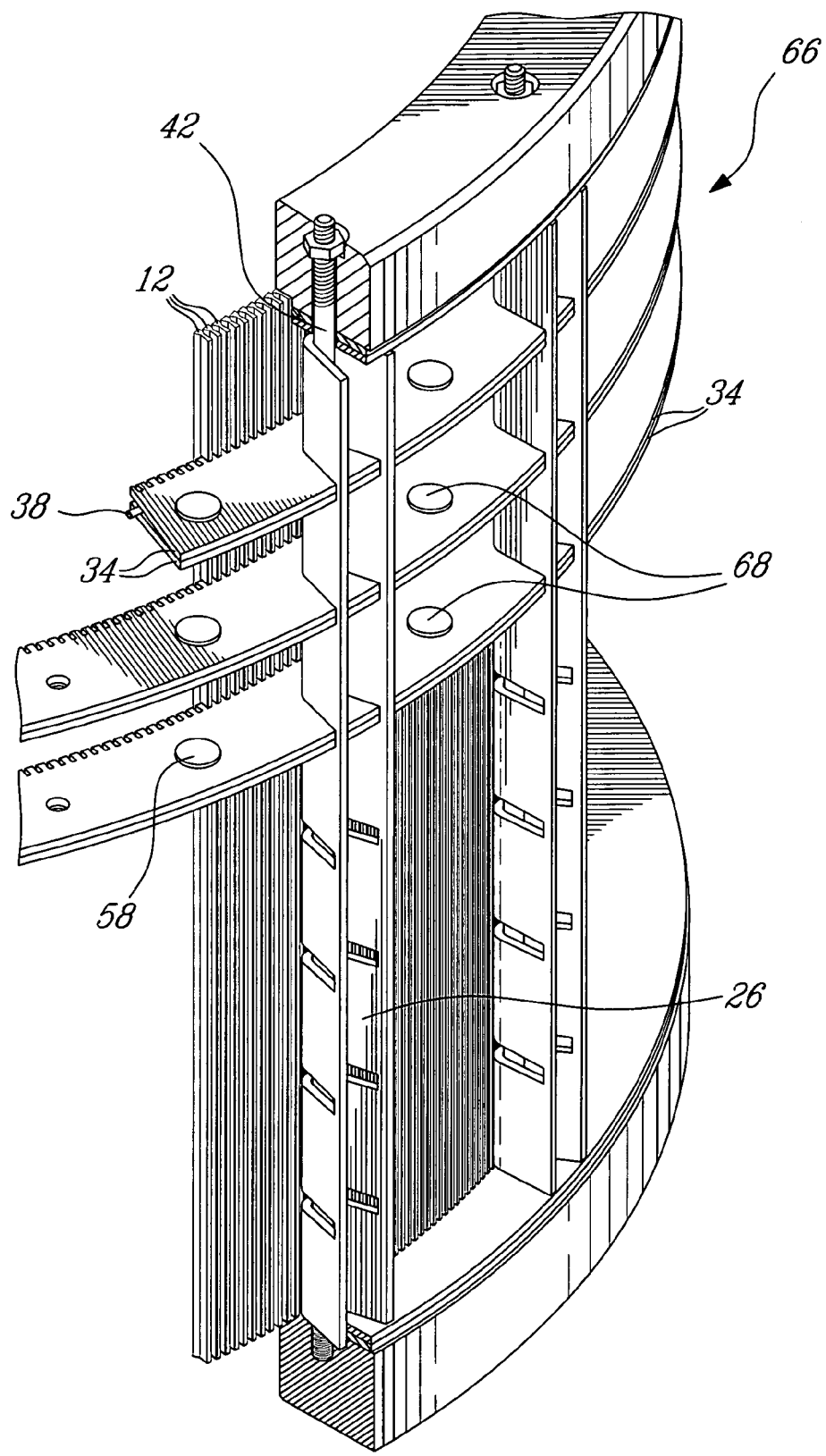
FIG. 7 is a perspective partly sectional view of a demountable screen basket according to a fourth illustrated embodiment of the present invention.

Turning now to FIG. 7 of the appended drawings, a demountable screen basket 66 according to a fourth illustrative embodiment of the present invention will be described. Since the screen basket 66 is very similar to the screen basket 10, and for concision purposes, only the differences between the two screen baskets 10 and 66 will be described herein in more detail.

The screen basket 66 further includes fasteners 68 for pressing the two rings 34 together axially and then forcing the insert 38 towards the profiled bars 12 as illustrated in FIGS. 4B and 4D. The fasteners 68 can take any form including rivets, bolts, clips, etc.

The use of such fasteners 68 allows limiting the number of clamping combs 26 and rods 42.

Figure 8:
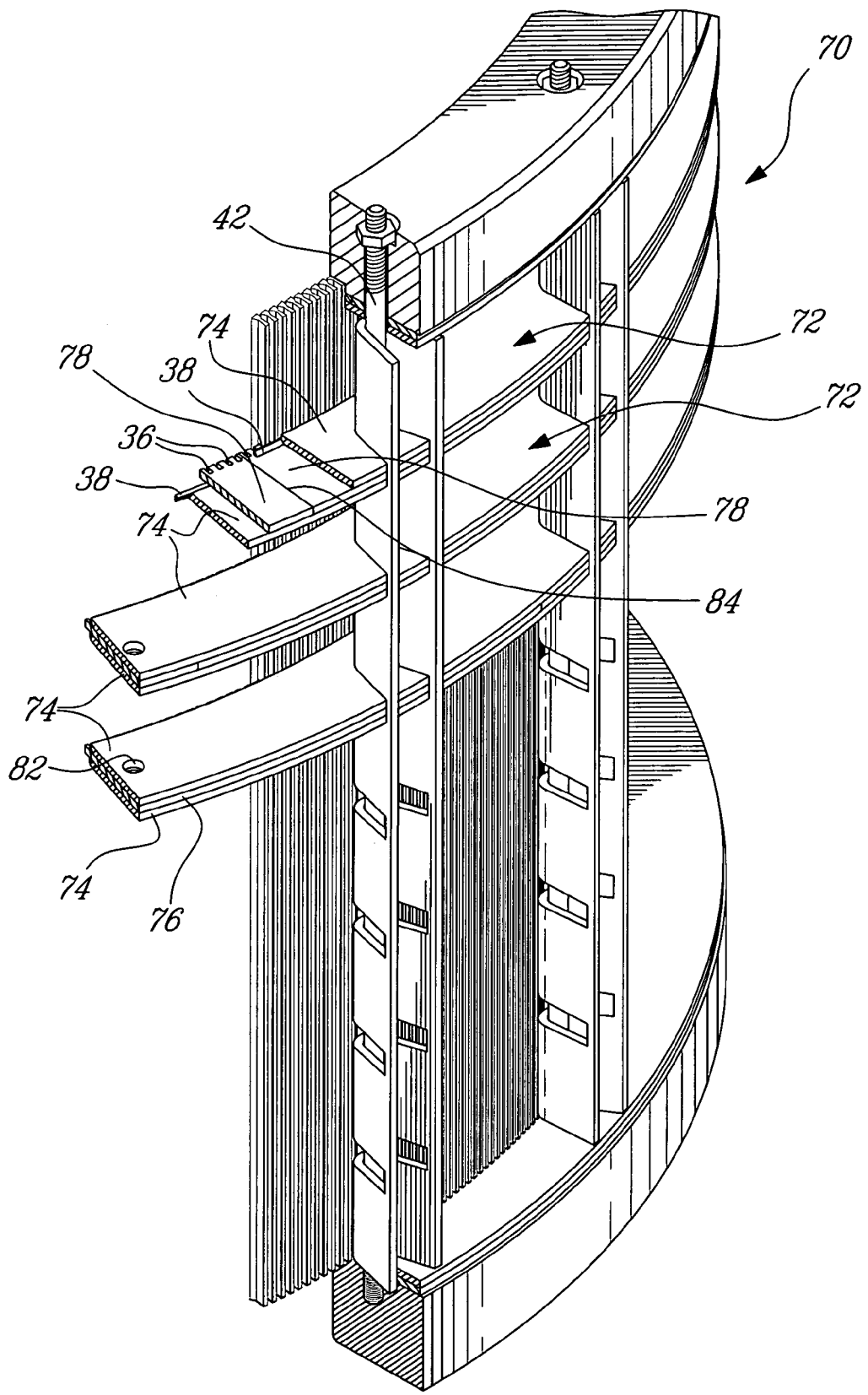
FIG. 8 is a perspective partly sectional view of a screen basket according to a fifth illustrated embodiment of the present invention.
Figure 9A:
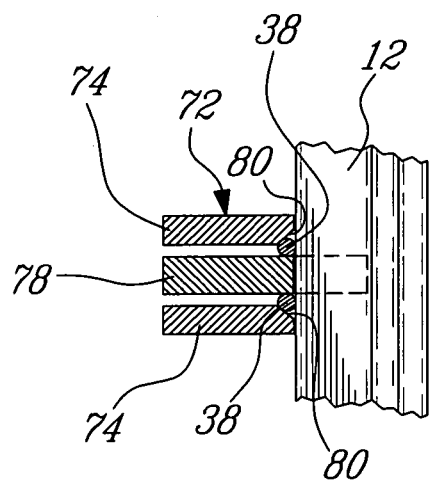
FIGS. 9A and 9B are isolated radial cross sections of the assembly of a profiled bar and a support ring assembly of the screen basket from FIG. 8.
Figure 9B:
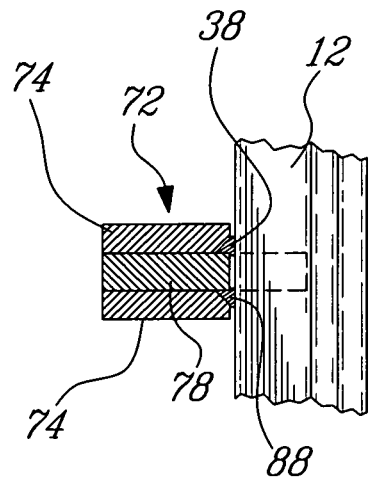

A screen basket 70 according to a fifth illustrative embodiment of the present invention will now be described with reference to FIGS. 8 and 9A-9B. Since the screen basket 70 is very similar to the screen basket 10, and for concision purposes, only the differences between the baskets 10 and 70 will be described in more detail. As will now become more apparent, the main difference between the two baskets 10 and 70 is the support ring assemblies 72 of the screen basket 70 which differ from the support ring assemblies 22.

Each support ring assembly 72 includes first and second integral rings 74 which, similarly to the rings 34 of the basket 10, extend along all the periphery of the basket 10, and an intermediary grooved disk 76, which is made of a plurality of angular segments 78, mounted between the first and second rings 74.

The grooved disk 76 includes grooves 36 for complementary receiving the locking portions 30 of the profiled bars 12 as discussed hereinbelow in more detail.

The support ring assembly 72 further comprises two compressible inserts in the form of rings 38 positioned between a respective support ring 74 and grooved disk 76 adjacent to the profiled bars 12. The inner side of each support ring 74 is provided with a chamfer 80 for biasing the inserts 38 towards profiled bars 12 when the support ring assembly 72 is compressed as illustrated in FIG. 9B. Also, as illustrated in FIG. 9B, the support ring assembly 72 allows forcing the locking portion of the bars 12 towards the grooves 36, providing the locking effect discussed in further detail hereinabove.

Of course, the support rings 74 and intermediary ring 76 are provided with holes 82, similar to holes 46 of the basket 10, for securing the rods 42. To provide better stability, the holes 46 are positioned so that each segment 78 includes at least one hole and therefore receives at least one rod 42. Moreover, the joints 84 between two segments 78 are preferably offset for two adjacent support ring assemblies 72.

The use of a grooved disk 76 made of segments 78 allows minimizing the lost of material. For example, when only a portion of the disk 76 is damaged, only the corresponding segments can be changed.

The number of sections 78 forming the grooved disk 76 may of course vary. Typically, 6 angular segments 78 are used.

Turning now to FIGS. 10A-10D, a support ring assembly 86 for a screen basket according to a sixth illustrative embodiment of the present will now be described. Since the support ring assembly 86 is very similar to the support ring assembly 72, only the differences between these two assemblies, relating mainly to the support ring assembly, will be further described herein.

Instead of compressible inserts, such as the elastomer rings 38, the support ring assembly 72 includes open rings 88, having a triangular cross section for respective complementary insertion in the chamfers 80.

Figure 10A:
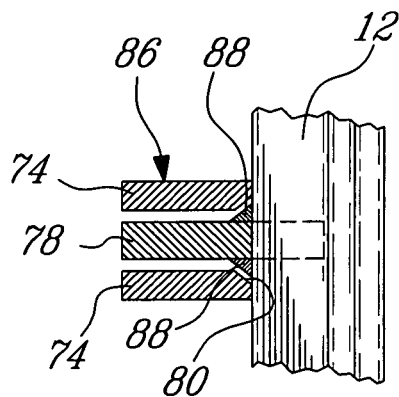
FIGS. 10A and 10B are isolated radial cross sections of the assembly of a profiled bar and a support ring assembly of a screen basket according to a sixth illustrated embodiment of the present invention.
Figure 10B:
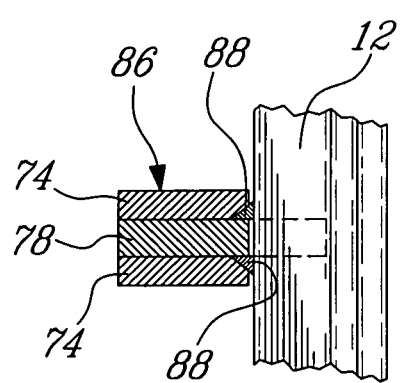
Figure 10C:
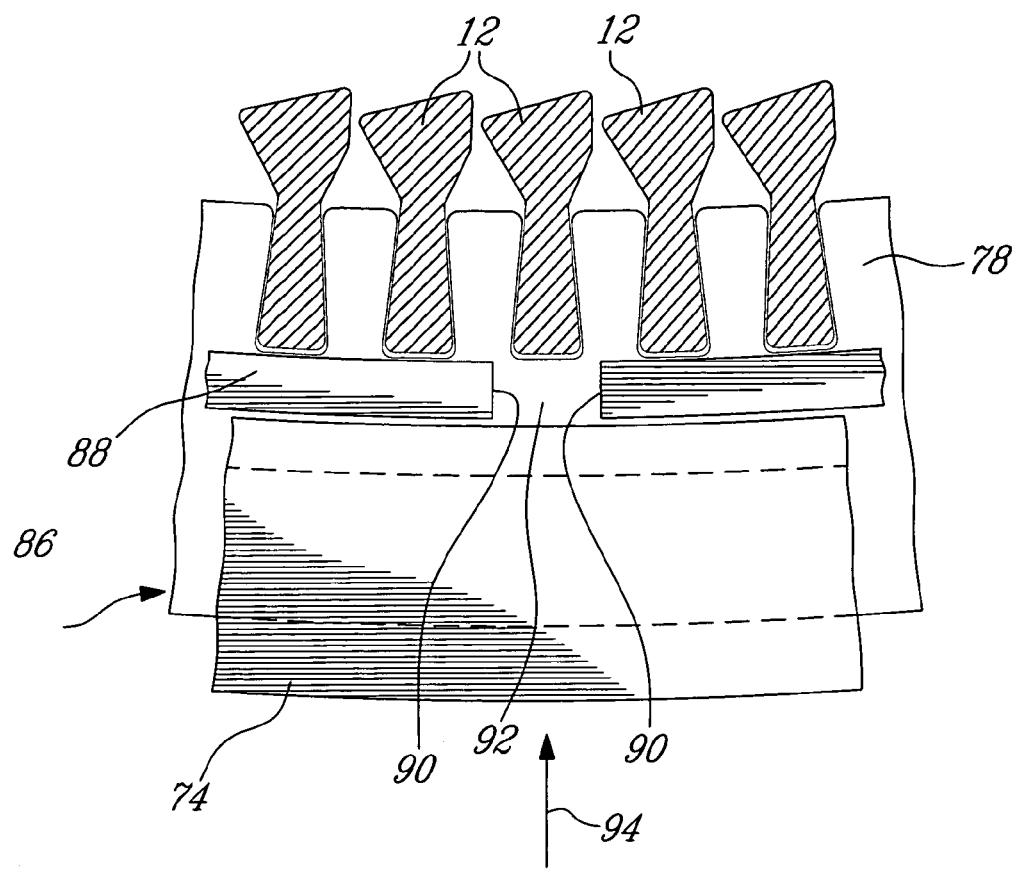
FIGS. 10C and 10D are isolated top-plan cross sections of the assembly the support ring assembly from FIGS. 10A-10B with profiled bars.
Figure 10D:
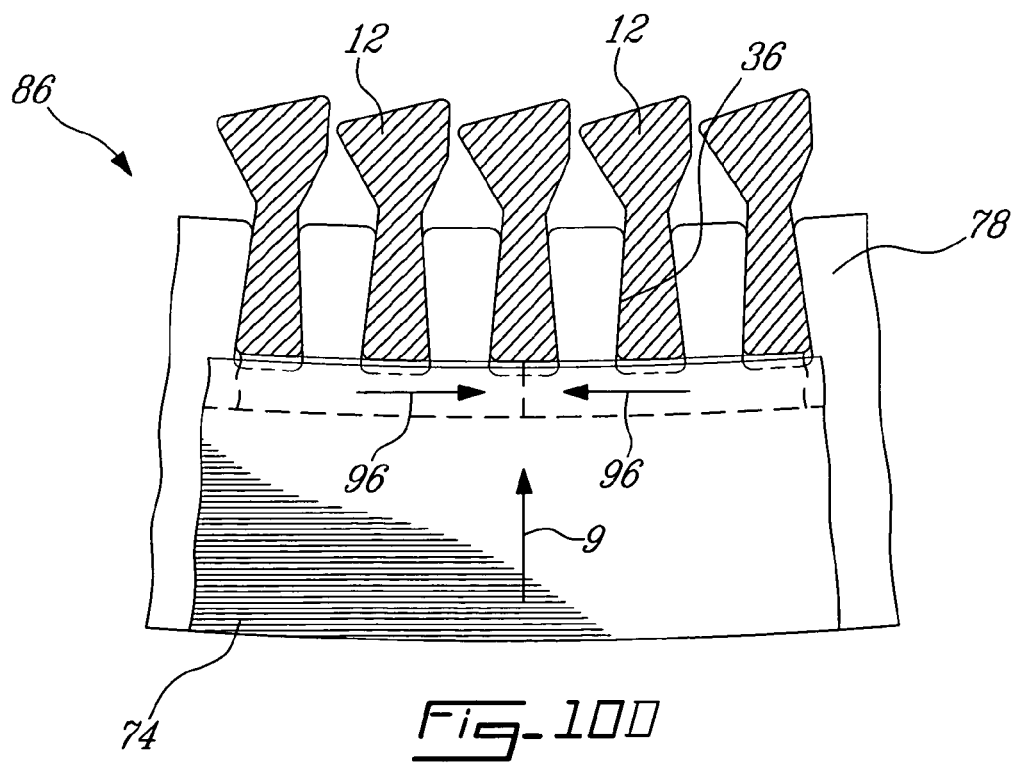

As illustrated in FIG. 10C, the rings 88 are sized so as to yield a gap 92 between its two extremities 90 when no pressure is exerted onto the two exterior support rings 74. However, when such a pressure is exerted onto the support rings 74 (see arrow 94 in FIG. 10C), its diameter shrinks, as allowed by the gap 92, bringing the two extremities 90 towards each other (see arrows 96) and immobilizing the locking portion of the bars 12 into the grooves 36.

The open rings 88 can be made for example of metal.

It is to be noted that the rings 88 can be replaced by any other suitable elements or materials which expand in a confined space.

Figure 11:
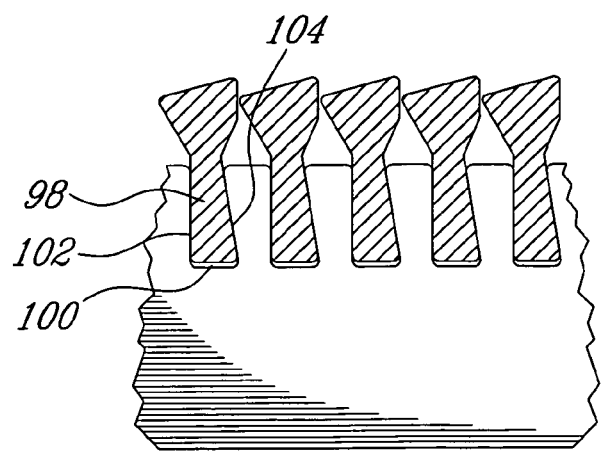
FIGS. 11 to 13 are top-plan cross sections illustrating back contours for the locking portions and for the corresponding complementary grooves of the support ring assemblies of screen baskets according to seven, eight and ninth illustrative embodiments of the present invention.
Figure 12:
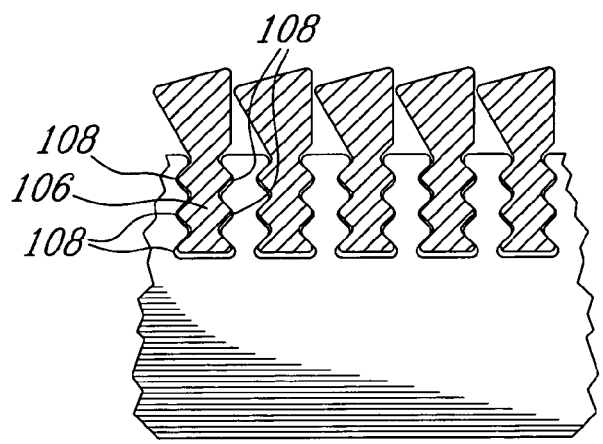
Figure 13:
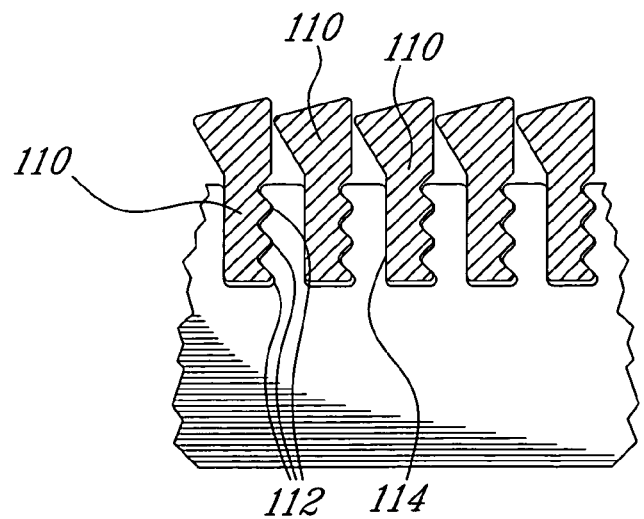

FIGS. 11 to 13 illustrate examples of back contours for the locking portions and for the corresponding complementary grooves of the support ring assemblies of screen baskets according to seven, eight and ninth illustrative embodiments of the present invention. In all three cases, since the grooves contours are complementary to the locking portion contours and therefore identical in shape, only the locking portion contours will be described herein in more detail.

FIG. 11 shows a first alternate configuration of locking portions 98 characterized by having an outer or abutting face 100, a first face 102 extending generally perpendicularly from the outer face 100, and a second face 104 opposite the first face 102, extending at an angled therefrom.

FIG. 12 illustrates locking portions 106 having multiple teeth 108 on both sides. FIG. 13 illustrates locking portions 110 with multiple teeth 112 on a single side, the other opposite side 114 being generally planar.

FIGS. 14A-14B and 15A-15B illustrate a clamping mechanism 116 according to a tenth illustrated embodiment of a screen basket of the present invention. Since the screen basket according to this tenth illustrated embodiment is very similar to the screen basket according to the second illustrated embodiment (see FIGS. 5A-5B), and for concision purposes, only the differences between these two embodiments will be described herein in more detail.

The clamping bar 116 includes sequentially alternating integral narrow portions 118 and wide portions 120.

As illustrated in FIGS. 15A and 15B, the narrow portions 118 have a height slightly less than the overall thickness of the two support rings 34 with the insert 58 when the support ring assembly 56 formed thereby is not compressed (see FIG. 15A) and generally corresponding to the overall thickness of the support ring assembly 56 when it is compressed (see FIG. 15B).

Each wide portion 120 has a height generally corresponding to the inter-space between two adjacent support ring assemblies 56.

Elongated holes 122 are provided in both the support rings 34 and inserts 58 at generally equally distanced circumferential position to receive the plurality of clamping posts 116.

As illustrated in FIGS. 14A and 15A, the elongated holes 122 are configured and sized to receive the posts 116 when the posts are oriented along the elongated side of the holes 122.

As illustrated in FIGS. 14B and 15B, the clamping posts 116 are then rotated 90 degrees from mounting position to obtain a pressed position (see arrows 124 on FIG. 14B). This rotation forces the wide portions 120 to engage over the support ring assemblies 56, thereby exerting a force onto the support ring assemblies 56 (see arrows 126). While in this pressed position, the support ring assemblies 56 are therefore compressed, yielding the locking effect described hereinabove in more detail.

The clamping post 116 can then be removably secured to the end flanges (not illustrated).

The present invention is not limited to a screen basket having support disk assemblies provided with two (2) or three (3) support rings. For example, four, or more rings pressed together with deformable inserts placed between some of those rings to obtain stronger joints can be provided. It is also possible for example to use a single support ring located at a certain distance in between two ring pairs. One or more rings could also be added to a ring pair without adding supplementary compressible insert.

A screen basket according to the present invention can be provided with profiled bars, support ring assemblies or support conforming to any shape or contour and clamping posts so configured and sized as to yield a screening surface which is flat, curved, stepped, conical, etc.

A screen basket having different combinations of aspects of the above illustrated embodiments can also be provided according to the present invention.

Even though the screen baskets according to the illustrated embodiments are all completely demountable, it is believed to be within the reach of a person skilled in the art to modify one of the illustrated screen baskets and/or use the above teaching to provide a screen basket which is only partly demountable so as to recycle only parts of its components for example.

Although the present invention has been described hereinabove by way of illustrated embodiments thereof, it can be modified without departing from the spirit and nature of the subject invention, as defined in the appended claims.

The invention claimed is:

1. A screen basket comprising:
   a plurality of profiled bars generally aligned along a longitudinal axis so as to define a slotted cylindrical wall having an inner side and an outer side extending between two longitudinal ends; each of the profiled bars having a radial profiled portion and a radial locking portion joined at an intermediate cross-section; the radial locking portion having an irregular cross-section including at least one radial cross-section wider than the intermediate cross-section; and
   at least one support ring assembly, mounted to at least some of the plurality of profiled bars substantially transversally therefrom for assembling the plurality of profiled bars into the slotted cylindrical wall; said support ring assembly including a support ring having a plurality of grooves therein; each groove being configured and sized for complementary receipt of the radial locking portion of a respective one of the profiled bars; said screen basket further including a moveable insert adjacent the support ring and the radial locking portion of the profiled bars, said screen basket further comprising means for applying a force to move said moveable insert radially toward the locking portions of the profiled bars, thereby providing a locking force by slidably moving the profiled bars and locking portions thereof toward the grooves.

2. A screen basket as recited in claim 1, wherein each of the grooves has a contour; the locking force moving the locking portions of the plurality of profiled bars towards the contours of the grooves.

3. A screen basket as recited in claim 2, wherein said at least one support ring assembly comprises a plurality of support ring assemblies, each removably mounted to at least some of the plurality of profiled bars, each of the plurality of support ring assemblies including a stack of first and second support rings, said means for applying a force to said moveable insert comprises means for compressing the stack of the first and second support rings, said moveable insert comprising at least one deformable insert;
   whereby, compressing the stack causes the at least one deformable insert to deform and to be forced radially towards the locking portions of the profiled bars, thereby providing the locking force.

4. A screen basket as recited in claim 3, wherein the at least one deformable insert is a compressible insert.

5. A screen basket as recited in claim 4, wherein the compressible insert is in the form of a ring.

6. A screen basket as recited in claim 3, wherein at least one of the support ring assemblies further comprising an intermediary non-grooved ring mounted between the first and second support rings, having a larger inside diameter than the first and second support rings and having a thickness; the at least one deformable insert being in the form of a compressible ring characterized by an uncompressed longitudinal width greater than the intermediary non-grooved ring thickness.

7. A screen basket as recited in claim 3, wherein the deformable insert is in the form of an open ring; wherein compressing the stack causes the open ring to close and to be forced radially towards the locking portions of the profiled bars.

8. A screen basket as recited in claim 7, wherein at least one of the first and second support rings has an edge adjacent the plurality of profiled bars provided with a chamfer for receiving the open ring.

9. A screen basket as recited in claim 3, wherein the means for compressing the stack of the first and second support rings includes at least one clamping post for clamping the plurality of support ring assemblies.

10. A screen basket as recited in claim 9, wherein the at least one clamping post is in the form of a clamping comb provided with longitudinal notches for receiving a respective one of the plurality of support ring assemblies.

11. A screen basket as recited in claim 9, wherein each support ring assembly has a first thickness when said each support ring assembly is not compressed; the at least one clamping post including sequentially alternating narrow and wide portions; each narrow portion having a first height which is less than the first thickness when the first support ring assembly is uncompressed and equal to the first thickness when the first support ring assembly is compressed; each wide portion having a second height generally corresponding to a longitudinal interspacing between two adjacent of the support ring assemblies; each one of the plurality of support ring assemblies being provided with at least one aperture having a wider side for allowing passage for the at least one clamping post when the at least one clamping post has its wide portions oriented along the wider side of the at least one aperture;

whereby, in operation, rotating the at least one clamping post of 90 degrees after insertion thereof in the at least one aperture causes the at least one clamping post to engage and compress the stack of the first and second support rings.

12. A screen basket as recited in claim 3, wherein the stack of first and second support rings further includes a third intermediary ring mounted between the first and second support rings; the at least one deformable insert including a first deformable insert mounted between the first and intermediary rings and adjacent to the locking portions of the profiled bars and a second deformable insert mounted between the second and intermediary rings adjacent to the locking portions of the profiled bars; the intermediary ring including the plurality of grooves.

13. A screen basket as recited in claim 12, wherein the intermediary ring is made of a plurality of angular segments.

14. A screen basket as recited in claim 13, further comprising at least one clamping post for receiving, longitudinally spacing and compressing the plurality of support ring assemblies.

15. A screen basket as recited in claim 12, wherein each of the first and second support rings has a respective edge adjacent the plurality of profiled bars provided with a chamfer for receiving the at least one deformable insert.

16. A screen basket as recited in claim 3, wherein the means for compressing the stack of the first and second support rings includes fasteners.

17. A screen basket as recited in claim 1, wherein the plurality of grooves are generally equidistanced.

18. A screen basket as recited in claim 1, wherein the radial locking portion is generally shaped like a dovetail.

19. A screen basket as recited in claim 1, further comprising a plurality of clamping posts for receiving and compressing the plurality of support ring assemblies.

20. A screen basket as recited in claim 1, wherein each of the plurality of support ring assemblies are removably mounted to at least some of the plurality of profiled bars transversally therefrom.

21. A method for assembling a screen basket comprising:
providing a support ring assembly having a support ring and a moveable insert adjacent said support ring; said support ring including a plurality of grooves therein;
providing a plurality of profiled bars, each having a radial profiled portion and a radial locking portion joined at an intermediate cross-section; the radial locking portion having an irregular cross-section including at least one radial cross-section wider than the intermediate cross-section;
inserting the radial locking portions of the profiled bars into the grooves of the support ring so as to align the profiled bars along a longitudinal axis and to define a slotted cylindrical wall having an inner side and an outer side extending between two longitudinal ends;
applying a force to the moveable insert to force said moveable insert radially toward the locking portions of the profiled bars thereby providing a locking force by slidably moving the profiled bars and locking portions thereof toward the grooves.

22. A method as recited in claim 21, wherein said support ring assembly comprises a plurality of support ring assemblies, each of the plurality of support ring assemblies including a stack of first and second support rings, said moveable insert comprising a deformable insert located between the first and second support rings and said step of applying a force to the moveable insert comprises installing clamping combs onto the plurality of support ring assemblies for receiving and compressing the support ring assemblies, thereby forcing the deformable insert towards the locking portion of the profiled bars.

23. A method as recited in claim 22, wherein the clamping combs have longitudinal ends; the method further comprising securing end flanges at the longitudinal ends of the clamping combs.

24. A screen basket comprising:
a plurality of profiled bars generally aligned along a longitudinal axis so as to define a slotted cylindrical wall having an inner side and an outer side extending between two longitudinal ends; each of the profiled bars having a radial profiled portion and a radial locking portion joined at an intermediate cross-section; the radial locking portion having an irregular cross-section including at least one radial cross-section wider than the intermediate cross-section; and
at least one support ring assembly, mounted to at least some of the plurality of profiled bars substantially transversally therefrom for assembling the plurality of profiled bars into the slotted cylindrical wall; said support ring assembly including a support ring having a plurality of grooves therein; each groove being configured and sized for complementary receipt of the radial locking portion of a respective one of the profiled bars; said screen basket further including a moveable insert adjacent the support ring and the radial locking portion of the profiled bars, said screen basket further comprising a force applying mechanism operatively associated with said moveable insert to bear upon said moveable insert and move said moveable insert radially toward the locking portions of the profiled bars, thereby providing a locking force by slidably moving the profiled bars and the locking portions thereof toward the grooves.

25. A screen basket as recited in claim 24 wherein said moveable insert comprises a ring.

* * * * *